United States Patent [19]

Lucas et al.

[11] Patent Number: 4,766,758

[45] Date of Patent: Aug. 30, 1988

[54] METHOD OF MEASURING STRAIN FORCES IN A PRESS

[75] Inventors: Mark H. Lucas, Maumee; Richard J. Grogan; Robert L. Wagner, both of Toledo; Richard T. Wilhelm, Holland, all of Ohio

[73] Assignee: Helm Instrument Co., Inc., Maumee, Ohio

[21] Appl. No.: 42,718

[22] Filed: Apr. 27, 1987

[51] Int. Cl.$^4$ .......................... G01L 25/00; G01L 5/00
[52] U.S. Cl. ................... 73/1 B; 73/862.04; 73/862.54; 100/99
[58] Field of Search ............... 73/1 B, 862.06, 862.54, 73/795, 826, 862.04; 100/99

[56] References Cited

U.S. PATENT DOCUMENTS

| | | | |
|---|---|---|---|
| 2,798,375 | 7/1957 | Elliot | 73/1 B |
| 3,534,442 | 10/1970 | Mahle | 73/862.54 |
| 4,378,592 | 3/1983 | Heiberger et al. | 100/207 X |
| 4,677,860 | 7/1987 | Wessolowski et al. | 73/1 B X |
| 4,708,011 | 11/1987 | Rautakorpi et al. | 73/1 B X |

*Primary Examiner*—Tom Noland
*Attorney, Agent, or Firm*—Marshall & Melhorn

[57] ABSTRACT

A method of monitoring the forces applied to dies in an underdrive press includes the step of determining the position of a frame in an upper slide of the press in relation to a surface of the slide. One or more force sensing transducers are then mounted on the surface of the upper slide each in a predetermined position with respect to the frame of the slide. The transducers are connected to a load monitoring device which is then calibrated to indicate the forces being applied to dies in the press during the operation of the press. The same steps are performed for each slide of an underdrive press having an inner upper slide and an outer upper slide.

15 Claims, 2 Drawing Sheets

METHOD OF MEASURING STRAIN FORCES IN A PRESS

BACKGROUND OF THE INVENTION

The present invention relates in general to methods of sensing forces utilizing transducers and in particular to a method of measuring strain forces in an underdrive press.

The ability to measure force or load is vital part of many industrial processees. Recognizing that a structure undergoes dimensional changes when subjected to a load, a measure of the dimensional change in a structure can accurately indicate the amount of force applied thereto. Such measurement is usually made through the use of a wire, foil or semi-conductor element intimately bonded to the structure. By measuring the change in the electrical resistance of the element, which resistance is a function of the change in cross-section of the element due to alterations in the dimensions of a structure, it is possible to accurately measure the load applied to the structure.

In the case of metal stamping processees, the dangers associated with the improper adjustment of the press and associated dies include broken presses, smashed tooling, and high rejection rates for the stamped products. Many of these losses could be prevented if the human operator and/or a control circuit had access to an accurate indication of the loads being imposed upon the dies. In an underdrive press, where one or more upper slides are connected to a drive system with connecting rods, many prior art attempts have been made to measure the forces imposed upon the dies. Strain sensing transducers have been located on the dies, on the shoes, on the slides, and on the inside of the press bed to measure compressive forces, and on the connecting rods and on the pull rods to measure tension forces. However, these prior art methods of measuring the forces imposed upon the dies have provided less than satisfactory results.

SUMMARY OF THE INVENTION

The present invention concerns a method of measuring the strain forces in an underdrive press. First, the location of the frame in the upper slide of the press must be determined. One or more strain sensing transducers can then be located on the top surface or the side surfaces of the upper slide. The preferred locations are the ends or the corners of the frame adjacent the connecting points to the pull rods. The transducers are connected to a load monitoring device which is then calibrated to indicate the forces being applied to the dies in the press during the operation of the press.

If the press has both an inner and an outer upper slide, the same steps are performed to locate the frames of both of the slides and separate transducers are mounted on the outer surfaces of both of the slides in the predetermined locations.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
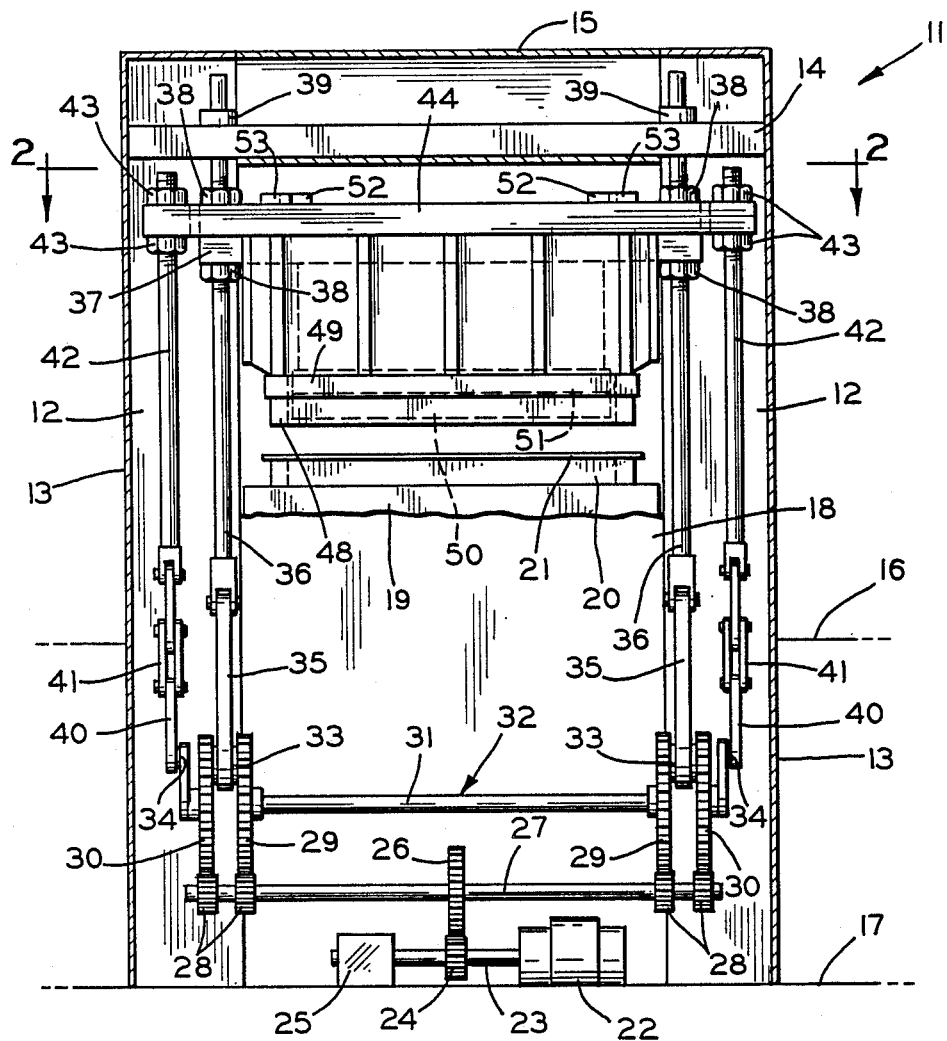
FIG. 1 is a front elevational view in cross section of an underdrive press showing a system for monitoring strain forces according to the present invention.
Figure 2:
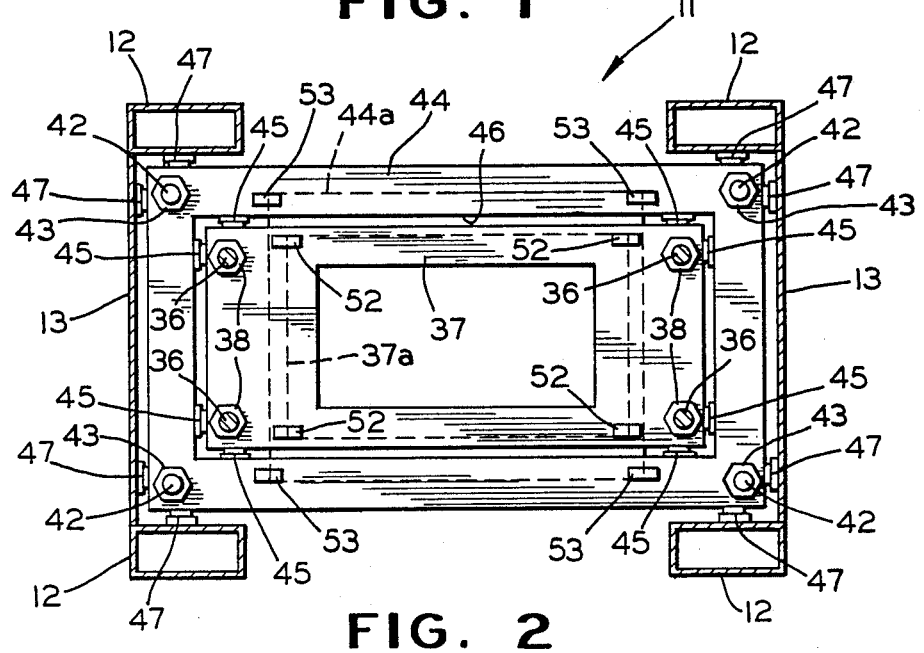
FIG. 2 is a top plan view of an underdrive press in cross section as if taken along the line 2—2 in FIG. 1.

There is shown in FIG. 1 a straight-sided, vertical frame press 11. The press 11 has a direct twin-end double geared underdrive and is a double action type with four-point suspension. The frame of the press 11 includes four vertically extending uprights 12 of a box-type construction. The uprights 12 are positioned at the corners of a rectangular pattern. The shorter distance between each pair of the uprights 12 is closed by a sidewall panel 13. The spaces defined by the longer distances between pairs of the uprights 12 remain open as the front and back of the press to permit access for changing the dies and processing parts to be formed in the press. A crown 14 is attached near the upper ends of the uprights 12. The top of the frame is closed by a cover plate 15 which is attached to the top ends of the uprights 12.

The lower ends of the uprights 12 extend through an opening in a floor 16 of the work place and engage a support surface 17 which can be, for example, the bottom of a pit or a sub-floor. Also resting on the support surface 17 is a bed 18 of the press located among the uprights 12 and extending upwardly through the aperture in the floor 16. Attached to the upper end of the bed 18 is a lower shoe 19. The lower shoe 19 is provided for the attachment of a lower die 20 for forming a product from a workpiece 21 resting on an upper surface of the lower die 20.

A drive system for the press 11 is formed of several components which are positioned around the bed 18 between the uprights 12. An electric motor 22 is mounted on the support surface 17 and includes a drive shaft 23. The drive shaft 23 can have a pinion gear 24 mounted thereon and can extend into a brake and bearing support 25.

The pinion gear 24 engages an intermediate gear 26 which is attached to an intermediate shaft 27 that extends the width of the bed 18. A pair of intermediate pinion gears 28 are attached at either end of the intermediate shaft 27. The pinion gears 28 each engage an associated gear such as inner drive gears 29 and outer drive gears 30. The inner drive gears 29 are attached at opposite ends of a central portion 31 of a crankshaft 32. Each of the inner gears 29 is positioned adjacent one of the outer gears 30 and these adjacent gears are connected by an eccentric throw portion 33 of the crankshaft 32. Each end of the crankshaft 32 terminates in a second throw portion 34. This drive system is known as an underdrive since it is located below the area where the dies are located and is a direct twin-end double geared underdrive system. However, the invention according to the present invention will work with any underdrive type press.

A pair of connecting rods 35 each have one end rotatably mounted on one of the throw portions 33 of the crankshaft 32. The upper end of each connecting rod 35 is rotatably connected to the lower ends of a pair of inner pull rods 36. The inner pull rods 36 extend upwardly through an inner slide 37 and through the crown 14 terminating in the area between the crown 14 and the cover plate 15. Each of the inner pull rods 36 is externally threaded in the area of the inner slide 37. A pair of adjusting nuts 38 threadably engage the inner pull rod 36 with one of the nuts being positioned above the inner slide 37 and the other below the inner slide 37 so as to provide adjustable means for positioning an upper die with respect to the lower die 20. The upper ends of the inner pull rods 36 are slidably retained in bushings 39 mounted on the crown 14. In another form of adjustment means, an electric motor driven worm gear drive system can be utilized in place of the adjusting nuts 38 to move the inner slide simultaneously with respect to the four inner pull rods 36 and individual manual adjustments provided for leveling the inner slide 37 with respect to the lower die 20.

A second pair of connecting rods 40 each have a lower end rotatably connected to an associated one of the second throw portions 34. An upper end of each of the connecting rods 40 is rotatably attached to a connecting linkage 41 which in turn is rotatably attached to the lower ends of each of a pair of outer pull rods 42. The upper ends of the outer pull rods 42 are externally threaded to each engage a pair of adjusting nuts 43. The threaded upper ends of the outer pull rods 42 extend through an outer slide 44 and one of the adjusting nuts 43 in each pair associated with each of the outer pull rods 42 is positioned above the outer slide 44 while the other nut in the pair is positioned below the outer slide 44. Similarly to the adjusting nuts 38, the adjusting nuts 43 are utilized to position the outer slide 44 with respect to the lower die 20. Also, the adjusting nuts 43 could be replaced by the motor driven adjusting system described above with respect to the inner slide 37.

The connecting rods 40 are typically connected to the second throw portions 34 at a greater radius than the connection of the connecting rods 35 to the throw portions 33 with respect to the longitudinal axis of the crankshaft 32. Thus, the outer slide 44 moves downwardly in advance of the inner slide 37 and moves upwardly after the inner slide 37 begins it upward movement. The outer vertical surfaces of the inner slide 37 slidably engage a plurality of gib assemblies 45 mounted on the vertical surfaces of an aperture 46 formed in the center of the outer slide 44. Similarly, the outer slide 44 is guided by a plurality of gib assemblies 47 mounted on the uprights 12 and sidewall panels 13.

An upper outer die 48 is attached to a downwardly facing surface of an upper outer shoe 49 which in turn is attached to the lower surface of the outer slide 44. The upper outer die 48 and the upper outer shoe 49 each have central apertures formed therein for receiving an upper inner die 50 attached to a downwardly facing surface of an upper inner shoe 51 which in turn is attached to a downwardly facing surface of the inner slide 37.

When the underdrive system pulls the inner slide 37 and the outer slide 44 downwardly to engage the upper outer die 48 and the upper inner die 50 with the lower die 20, strain forces are created in the various elements of the press 11. It is critical in the manufacturing process to distribute the press load evenly over the surfaces of the dies in order to make good parts, extend die life and prevent breakage of the dies and the press.

In the prior art, strain sensing transducers have been located on the dies 20, 48 and 51, on the shoes 19, 49 and 51, on the connecting rods 35 and 40, on the pull rods 36 and 42, and on the inside of the press bed 18. Applicant's invention involves a method of determining the forces applied to the dies in a press by measuring the tension strain forces generated at predetermined positions on the inner slide 37 and the outer slide 44.

A plurality of transducers 52 are positioned on an upper surface of the inner slide 37 for measuring the forces applied to the upper inner die 50. In the preferred embodiment, four transducers 52 are utilized with each transducer mounted directly above an associated corner of a frame 37a of the inner slide 37. A lesser number or greater number of transducers could be utilized, but four transducers mounted in the position shown provide satisfactory accuracy and reliability.

A second plurality of transducers 53 are mounted on an upper surface of the outer slide 44. In the preferred embodiment, four transducers 53 are utilized with each being mounted above an associated corner of a frame 44a of the outer slide 44. A greater number or lesser number of transducers 53 could be utilized, but four provide satisfactory reliability and accuracy.

Figure 3:
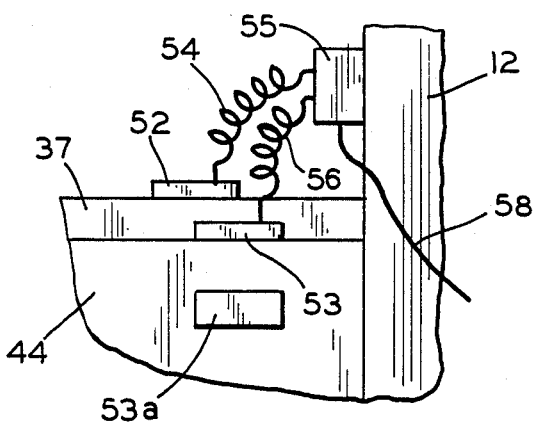
FIG. 3 is an enlarged fragmentary front elevational view of a portion of the upper slide portion of the press shown in FIG. 1.

In FIG. 3, a pair of the transducers 52 and 53 are shown installed on the top surfaces of the inner slide 37 and outer slide 44 respectively. An alternate mounting location is on the side of the slide 44 as shown by a transducer 53a. The slides 37 and 44 are shown as they would be positioned during a downstroke or an upstroke. The transducer 52 includes a cable assembly 54 which is connected between the transducer and a junction box 55 mounted on the upright 12. Similarily, a cable assembly 56 is connected between the transducer 53 and the junction box 55. The cable assemblies 54 and 56 are coiled and are formed of a resilient material which permits extension and retraction as the slides 37 and 44 move up and down with respect to the position of the junction box 55. Thus, the cable assemblies 54 and 56 tend to prevent damage to the strain force measuring system by keeping the connecting wires out of the way of the moving parts of the press.

Figure 4:
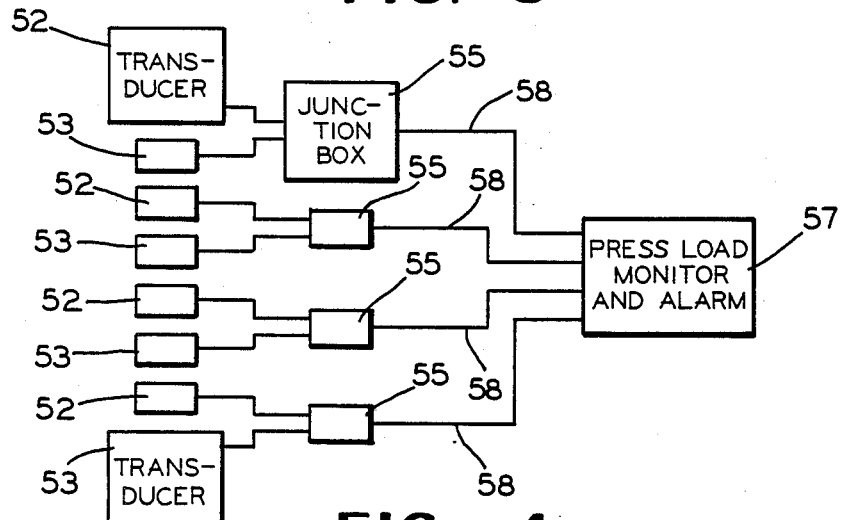
FIG. 4 is a block diagram of a strain force monitoring system for use with the method according to the present invention.

The junction box 55 is connected to a press force indicating system 57 (FIG. 4) by a cable assembly 58. The transducers 52 and 53 can be strain gauge bridge transducers manufactured by Helm Instrument Co., Inc. under the tradename STRAIN GAIN. As shown in FIG. 4, all of the cables 58 from the junction boxes 55, are connected to a press load monitor and alarm 57. The monitor and alarm 57 includes circuitry for converting the signals from the transducers 52 and 53 into signals representing the actual forces applied to the dies. The monitor and alarm 57 is calibrated by placing load cells in the press and comparing the actual forces applied to the load cells with the signals received from the transducers 52 and 53. The monitor and alarm 57 can include display devices such as analog meters or digital readouts which respond to the transducer signals to display the strain forces in desired units such as tons. The monitor and alarm 57 can also include adjustable alarm circuitry which permits an operator to set alarm limits to alert the operator and/or stop the operation of the press should one or more of the transducers 52 and 53 sense an out of range strain force. The monitor and alarm 57 is available from Helm Instrument Co., Inc. under the trademarks HELMSMAN, LOADGARD, and MULTIGUARD.

Figure 5:
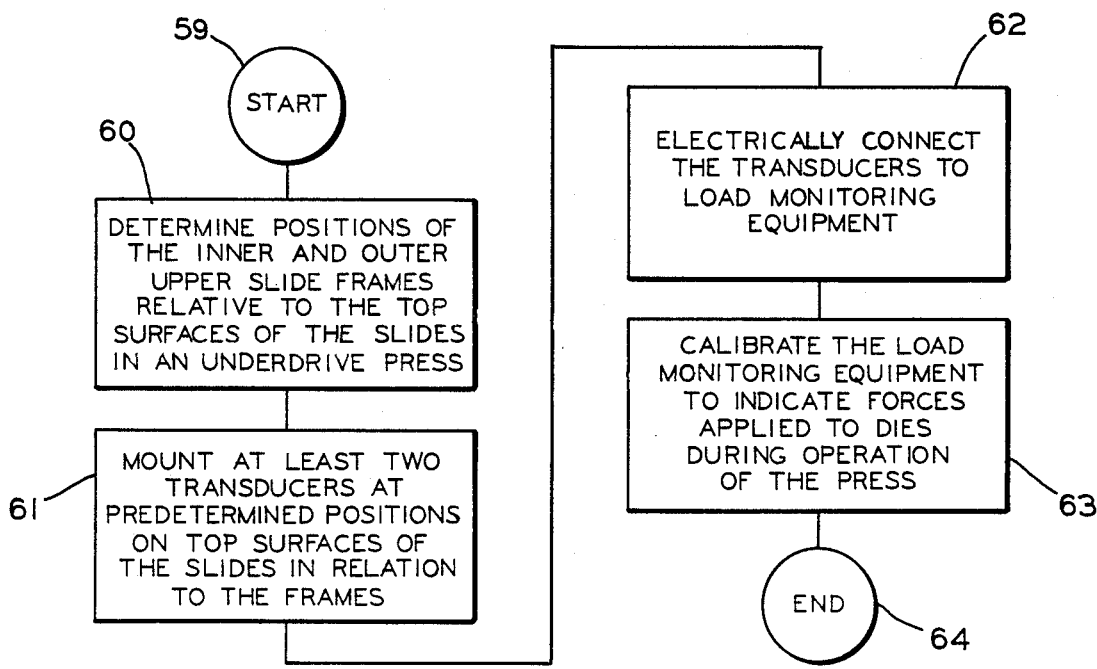
FIG. 5 is a flow diagram of the method according to the present invention.

A flow diagram of the method according to the present invention is shown in FIG. 5. The method begins at a start circle 59 and enters a first step 60 to determine the positions of the inner and outer upper slide frames relative to the top surfaces of the slides in an underdrive press. The next step 61 involves mounting at least two transducers at predetermined positions on the top surfaces of the slides in relation to the frames. As stated above, a preferred configuration would be four transducers with one mounted at each corner of the frame. The next step 62 involves electrically connecting the transducer to load monitoring equipment. The next step 63 requires the calibration of the load monitoring equipment to indicate the forces applied to dies during the operation of the press. The method then terminates at end circle 64. As previously stated, the side surfaces of the slides could be utilized instead of the top surfaces in steps 60 and 61.

Previously, many attempts have been made to accurately measure the loads generated by double action presses. Strain sensing transducers have been applied to the slides to measure the compressive forces developed as a part is being made. Transducers have been applied to the pull rods to measure the tension forces created as the pull rods attempt to separate from the slide. Both of these methods tend to be unrepeatable and generate erroneous readings. The present invention provides an accurate and repeatable method of measuring the load by sensing the tension forces generated in the slides as the pull arms attempt to separate.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of measuring strain forces in an underdrive press having a lower shoe attached to a bed, and an upper shoe attached to a movable slide, the upper and lower shoes adapted to retain upper and lower dies respectively, comprising the steps of:
   a. determining the position of a frame of the movable slide relative to a surface of the movable slide in the underdrive press, the movable slide being an upper slide; and
   b. mounting at least two strain force sensing transducers at predetermined positions on said surface of said upper slide in relation to said slide frame whereby said transducers generate signals representing the forces applied to said dies, they being attached to the upper and lower shoes of the press during operation of the press.

2. The method according to claim 1 wherein said transducers are strain gage transducers and said signals are electrical signals.

3. The method according to claim 2 including a step of electrically connecting said transducers to a load monitoring device to indicate the forces being sensed by said transducers.

4. The method according to claim 3 including connecting said transducers to said load monitoring device with coiled resilient cables.

5. The method according to claim 1 wherein the upper slide includes an inner upper slide and a lower upper slide, step a. includes determining the position of a frame in each of the inner and outer upper slides, and step b. includes mounting at least two strain sensing transducers at predetermined positions on the surfaces of each of the inner and outer upper slides in relation to the respective slide frames.

6. The method according to claim 5 including a subsequent step of electrically connecting said transducers to a load monitoring device with coiled resilient cables to indicate the forces sensed by said transducers.

7. The method according to claim 6 including a subsequent step of calibrating said load monitoring device to indicate the forces applied to dies attached to the inner and outer upper slides during the operation of the press.

8. A method of measuring the forces applied to dies in an underdrive press having a bed adapted to retain a lower die, an inner upper slide adapted to retain an inner upper die and an outer upper slide adapted to retain an outer upper die, comprising the steps of:
   a. determining the position of a frame of the inner upper slide relative to a surface of the inner upper slide in the underdrive press;
   b. determining the position of a frame of the outer upper slide relative to a surface of the outer upper slide in the underdrive press;
   c. mounting at least a first strain force sensing transducer at a predetermined position on said surface of the inner upper slide, whereby said transducer generates a signal representing the force applied to the inner upper die, it being attached to the inner upper slide during operation of the press;
   d. mounting at least a second strain force sensing transducer on said surface of the outer upper slide, whereby said second transducer generates a signal representing the force applied to the outer upper die, it being attached to the outer upper slide during operation of the press;
   e. connecting said first and second transducers to a load monitoring device to indicate the forces being sensed by said first and second transducers; and
   f. calibrating said load monitoring device to indicate the forces applied to said inner and outer upper dies during the operation of the press.

9. The method according to claim 8 wherein step e. includes connecting said first and second transducers to said load monitoring device with coiled resilient cables.

10. The method according to claim 9 wherein said first and second transducers are strain gauge transducers and said signals are electrical signals.

11. A method of measuring the forces applied to dies in an underdrive press having a bed adapted to retain a lower die, an inner upper slide adapted to retain an inner upper die, and an outer upper slide adapted to retain an outer upper die, comprising the steps of:
   a. determining the position of a frame of the inner upper slide relative to a surface of the inner upper slide in the underdrive press;
   b. determining the position of a frame of the outer upper slide relative to a surface of the outer upper slide in the underdrive press;
   c. mounting at least four strain force measuring transducers on said surface of the inner upper slide with at least one of said transducers being mounted adjacent each corner of the frame of the inner upper slide, whereby said transducers each generate a signal representing the force applied to a corresponding area of the inner upper die, it being attached to the inner upper slide during operation of the press;

d. mounting at least four strain force measuring transducers on said surface of the outer upper slide with at least one of said transducers being mounted adjacent each corner of the frame of the outer upper slide, whereby said transducers each generate a signal representing the force applied to a corresponding area of the outer upper die, it being attached to the outer upper slide during operation of the press;

e. connecting each of said transducers to a load monitoring device to indicate the forces being sensed by each of said transducers; and f. calibrating said load monitoring device to indicate the forces applied to said inner and outer upper dies during the operation of the press.

12. The method according to claim 11 wherein step e. is performed by connecting said transducers to said load monitoring device with coiled resilient cables and wherein said transducers are strain gauge transducers.

13. The method according to claim 11 wherein said surface of the inner upper slide is a top surface.

14. The method according to claim 13 wherein said surface of the outer upper slide is a top surface.

15. The method according to claim 11 wherein said surface of the outer upper slide is at least one side surface.

* * * * *